United States Patent [19]

Wakamatsu et al.

[11] 3,909,670

[45] Sept. 30, 1975

[54] LIGHT EMITTING SYSTEM

[75] Inventors: Hisato Wakamatsu, Toyota; Matatoyo Hinachi, Nagoya; Masao Kotera, Okazaki, all of Japan

[73] Assignee: Nippon Soken, Inc., Nishio, Japan

[22] Filed: June 25, 1974

[21] Appl. No.: 482,989

[30] Foreign Application Priority Data
June 27, 1973 Japan............................. 48-72527

[52] U.S. Cl............... 315/276; 240/8.14; 240/8.18; 315/79; 315/129; 315/281; 340/87; 340/366 A; 340/373
[51] Int. Cl........................ B60q 3/04; H05b 33/02
[58] Field of Search . 315/77, 79, 80, 129, 134–136, 315/276, 281; 240/2.1, 8.14, 8.16, 8.18, 8.28, 10.1, 61.9, 62 B, 62.4, DIG. 3; 340/52 D, 62, 87, 266, 366 A, 366 D, 373; 116/129, DIG. 6, DIG. 36

[56] References Cited
UNITED STATES PATENTS
3,162,789 12/1964 Schlaich..................... 250/231 R X
3,331,200 7/1967 Byron et al. ................. 250/23 R X
3,714,453 1/1973 Delisle et al.................... 324/157 X

*Primary Examiner*—R. V. Rolinec
*Assistant Examiner*—E. R. LaRoche
*Attorney, Agent, or Firm*—Cushman, Darby & Cushman

[57] ABSTRACT

There is provided a light emitting system comprising an oscillator for generating oscillations at a high frequency, a fixed coil adapted to be energized by the output of the oscillator, a movable coil electromagnetically coupled with the fixed coil and adapted to be energized by the intermittent energization of the fixed coil, and a light emitting element connected to the movable coil to form a closed circuit and adapted to give light by an exciting current produced by the energization of the movable coil. The system thus eliminates the use of any mechanical sliding contact unit.

7 Claims, 2 Drawing Figures

U.S. Patent Sept. 30,1975 3,909,670

3,909,670

LIGHT EMITTING SYSTEM

BACKGROUND OF THE INVENTION

1. Field of the Invention

The present invention relates to a light emitting system wherein a light emitting element mounted on a moving member such as the needle of a meter or the operating button of a switch is operated to give light.

2. Description of the Prior Art

Light emitting systems heretofore known in the art are of the type which comprises a power source mounted on a fixed part, a sliding electrical contact unit for supplying power from the power source to a moving part and a light emitting element mounted on the moving part and connected to the sliding contact unit. A disadvantage of this type of known light emitting system is that the sliding electrical contact unit is subject to deterioration of considerable degree and therefore the system is not reliable in operation.

SUMMARY OF THE INVENTION

With a view to overcoming the foregoing difficulty, it is an object of the present invention to provide a light emitting system comprising, on a fixed part, an oscillator for oscillating at a high frequency, a fixed coil electrically connected to the output terminals of the oscillator and adapted to be energized by the output of the oscillator and a power source connected to the oscillator to supply power thereto, and, on a moving part, a movable coil electromagnetically coupled with the fixed coil and adapted to be energized by the intermittent energization of the fixed coil and a light emitting element connected to the movable coil to form a closed circuit and adapted to give light when current flows thereinto by the energization of the movable coil, whereby eliminating the use of any sliding contact and improving the reliability of operation.

The light emitting system according to the present invention has among its great advantage the fact that by virtue of its novel construction comprising, on a fixed part, an oscillator for oscillating at a high frequency, a fixed coil electrically connected to the output terminals of the oscillator and adapted to be energized by the output of the oscillator and a power source connected to the oscillator to supply power thereto, and, on a moving part, a movable coil electromagnetically coupled with the fixed coil and adapted to be energized by the intermittent energization of the fixed coil and a light emitting element connected to the movable coil to form a closed circuit and adapted to give light when current flows thereto by the energization of the movable coil, the system can operate with a high degree of reliability due to the absence of any mechanical sliding contact unit.

Another great advantage of the system is that in case a light emitting diode is employed as the light emitting element, the manufacture of the system may be simplified and the danger of electric shock and the like may be eliminated due to the fact that the light emitting diode can be operated from a low voltage and it can also give light under conditions other than in vacuum.

A further advantage of the system is that by virtue of the fact that the mass and shape of the light emitting diode and movable coil can be reduced considerably, it is possible to mount the light emitting diode on the tip of the needle of a meter or the like to which the greatest human attention is focussed, whereby to give the driver information on the occurrence of troubles with the systems with a high degree of accuracy and reliability, and it is also possible to mount the light emitting diode on the control knob, for example, so that the control knob can be very easily located in the night, for example.

BRIEF DESCRIPTION OF THE DRAWING

These and other objects, features and advantages of the present invention will be apparent from the following detailed description taken in conjunction with the accompanying drawings, in which.

DESCRIPTION OF THE PREFERRED EMBODIMENTS

The present invention will now be described in greater detail with reference to the illustrated embodiments.

Figure 1:
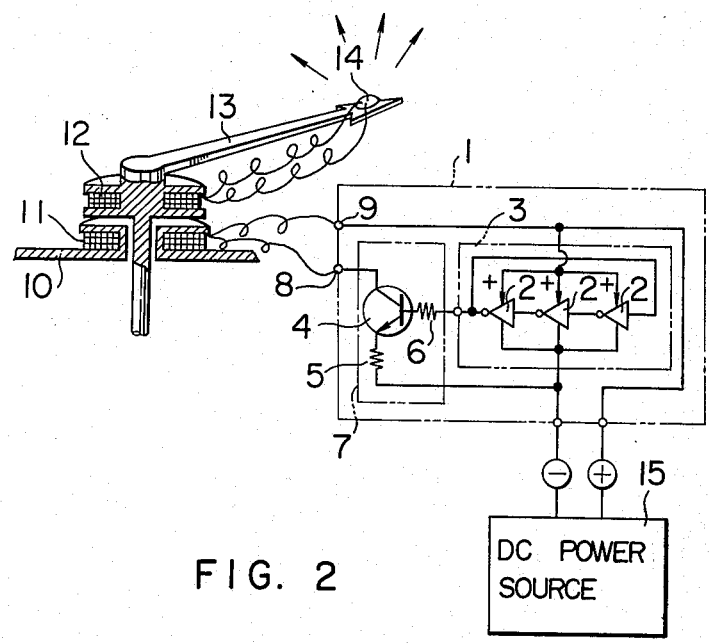
FIG. 1 is a schematic diagram showing an embodiment of a light emitting system according to the present invention.

Turning now to FIG. 1, an emodiment of the invention in which a light emitting diode for warning the driver that there is an irregularity in a vehicle is mounted on the needle of a speedometer, for example. In FIG. 1, numeral 1 designates an oscillator comprising an oscillator circuit 3 consisting of a ring oscillator having conventional inverters 2 connected in three stages and an amplifier circuit 7 composed of a transistor 4 and resistors 5 and 6. Numeral 11 designates a fixed coil connected to output terminals 8 and 9 of the oscillator 1 and mounted on a fixed member 10 of the speedometer. Numeral 12 designates a movable coil mounted on the moving member of the speedometer, i.e., a needle 13 in such a manner that it is electromagnetically coupled with the fixed coil 11, 14 a light emitting diode as the light emitting element connected to the terminal of the movable coil 12, 15 a DC power source connected to the oscillator 1. In addition to the light emitting diode, the light emitting element may for example be a fluorescent indicator tube.

With the construction described above, the light emitting system according to the embodiment of FIG. 1 operates as follows. When a condition occurs that causes the light emitting diode 14 to give a warning to the driver, the power from the DC power source 15 is applied to the oscillator 1 so that the oscillator circuit 3 starts oscillating at a high frequency. This high frequency oscillator output is applied to and amplified in the amplifier circuit 7. The amplified high frequency output appears at the output terminals 8 and 9 of the oscillator 1 and energizes the fixed coil 11. The magnetic flux produced as the result of the high frequency energization cuts through the movable coil 12 so that a high frequency current flows to the light emitting diode 14 or the load of the movable coil 12 and the light emitting diode 14 gives light.

Figure 2:
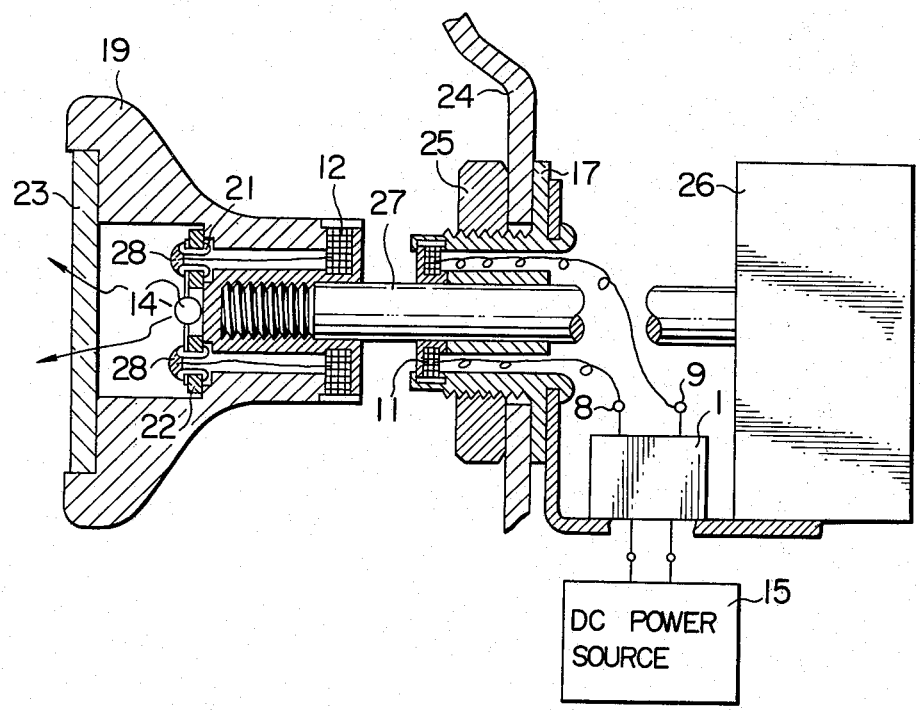
FIG. 2 is a sectional view showing another embodiment of the system according to the invention.

In FIG. 2, there is illustrated another embodiment of the invention in which a light emitting diode is mounted on the top of a control knob so that the driver may easily locate the position of an operating button for a headlight lighting switch or the like in the night. In FIG. 2, numeral 11 designates a fixed coil fixedly mounted on a locking bolt 17 of the switch, 12 a movable coil mounted on a control knob or the moving member of the switch. Numeral 14 designates a light emitting diode fixedly mounted on an insulating base 22 by a metal clamp 21 and connected to the terminals of the movable coil 12 by solders 28 to electrically form a closed loop. Numeral 23 designates an acrylic sheet, 24 a panel for mounting the switch, 25 a lock nut forming, along with the panel 24, a part of the vehicle as the fixed member, 26 a switch proper for opening and closing electric contacts in accordance with the displacement of an operating shaft 27.

With the construction described above, the light emitting system according to the second embodiment operates in the same manner as described in connection with the first embodiment.

With the two embodiments described herein above, when the RCA CD 40001 integrated circuits were used as the inverters 2, the Tokyo Shibarua Denki 2S 400 as the transistor 4, a 1 K$\Omega$ ¼ W resistor as the resistor 6, a 120 $\Omega$ ¼ W resistor as the resistor 7, a 20-turn coil as the fixed coil 11, an 8-turn coil as the movable coil 12, the Motorla MLED 55 as the light emitting diode 14 and a 12-volt power source as the DC power source 15, the oscillation frequency of the oscillator 1 was 8 MHz an the light output of the light emitting diode 14 was 80 microcandela.

What is claimed is:

1. A light emitting system comprising:
a fixed member;
an oscillator mounted on said fixed member oscillating at a high frequency;
a fixed coil mounted on said fixed member and connected electrically to the output terminals of said oscillator, said fixed coil being energized by the output thereof;
a power source mounted on said fixed member and connected to said oscillator to supply power thereto;
a moving member movable relative to said fixed coil;
a movable coil mounted on said moving member and electromagnetically coupled with said fixed coil; and
a light emitting element mounted on said moving member and connected to said movable coil to generate light by an excitation current from said movable coil.

2. A system according to claim 1, wherein said oscillator comprises an oscillator circuit composed of a ring oscillator having an odd number of NOT circuit stages connected in a circle, and an amplifier circuit for amplifying the output of said oscillator circuit.

3. A system according to claim 1, wherein said light emitting element is comprised of a light emitting diode.

4. A system according to claim 1, wherein said fixed member constitutes part of a vehicle body, and said moving member is comprised of a control knob mounted in the vehicle.

5. A system according to claim 4, wherein said light emitting element is comprised of a light emitting diode.

6. A system according to claim 1, wherein said fixed member constitutes part of a vehicle body, and said moving member constitutes a needle of a meter installed in the vehicle.

7. A system according to claim 6, wherein said light emitting element is comprised of a light emitting diode.

* * * * *